(12) United States Patent
Takagi

(10) Patent No.: US 7,982,949 B2
(45) Date of Patent: Jul. 19, 2011

(54) OPERATION MICROSCOPE HAVING ASSISTANT'S MICROSCOPE

(75) Inventor: Kazutoshi Takagi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 442 days.

(21) Appl. No.: 12/057,555

(22) Filed: Mar. 28, 2008

(65) Prior Publication Data
US 2008/0239473 A1 Oct. 2, 2008

(30) Foreign Application Priority Data

Mar. 30, 2007 (JP) ................................. 2007-091891

(51) Int. Cl.
*G02B 21/00* (2006.01)
(52) U.S. Cl. ..................... 359/384; 359/503; 359/506
(58) Field of Classification Search .................. 359/384, 359/503, 506
See application file for complete search history.

(56) References Cited

U.S. PATENT DOCUMENTS

| 4,783,159 | A | | 11/1988 | Takagi et al. | |
|---|---|---|---|---|---|
| 5,052,789 | A | * | 10/1991 | Kleinberg | ..................... 359/375 |
| 6,421,173 | B1 | * | 7/2002 | Corbisiero et al. | ........... 359/372 |
| 7,088,504 | B2 | * | 8/2006 | Fukaya et al. | ................ 359/378 |

FOREIGN PATENT DOCUMENTS

| EP | 1486813 | 12/2004 |
|---|---|---|
| JP | 2006-280805 | 10/2006 |

OTHER PUBLICATIONS

European Search Report, 08006082.5-2217/1975670, May 8, 2009.

* cited by examiner

*Primary Examiner* — Frank G Font
(74) *Attorney, Agent, or Firm* — Dickstein Shapiro LLP

(57) ABSTRACT

An operation microscope includes a microscope body having an illumination optical system which illuminates a subject, a lens barrel, and a main observation optical system which observes the subject, an assistant's microscope unit attached to the microscope body, and a guide rail which is disposed in the lens barrel of the microscope body, and extends in a circumferential direction about a center of an optical axis of an objective lens of the microscope body. The assistant's microscope unit is disposed in the guide rail to be movable between a usage position and a non-usage position in a circumferential direction of the lens barrel.

3 Claims, 6 Drawing Sheets

PRIOR ART

__US 7,982,949 B2__

OPERATION MICROSCOPE HAVING ASSISTANT'S MICROSCOPE

PRIORITY CLAIM

The present application is based on and claims priority from Japanese Patent Application No. 2007-091891, filed on Mar. 30, 2007, the disclosure of which is hereby incorporated by reference in its entirety.

BACKGROUND OF THE INVENTION

1. Field of the Invention

The present invention relates to an operation microscope including an assistant's microscope unit.

2. Description of the Related Art

There is known a conventional operation microscope including a microscope body having a main observation optical system which observes a subject, and an assistant's microscope unit (hereinafter referred to as a microscope unit) attached to the microscope body (refer to JP2006-280805A, for example).

In such an operation microscope, a microscope unit 3 is rotatably attached in the circumferential direction of a lens barrel 2 of a microscope body 1 as illustrated in FIG. 13, so as to be movable in accordance with a position that an assistant stands at the time of operation.

However, in this operation microscope, the microscope unit 3 is provided with an annular section 3a which is coaxially disposed to the lens barrel 2 and is rotatably supported. For this reason, it is impossible to provide more than one microscope unit 3.

As a measure for this problem, two of the microscope units 3 can be fastened to the right and left of the lens barrel 2. In this fastening structure of the microscope units 3, if the microscope unit 3 is inconvenient to an operator, the microscope unit 3 can be previously removed from the lens barrel 2 before the operation.

However, it is preferable for the microscope unit not to disturb the operator even if a plurality of microscope units 3 is provided as described above.

SUMMARY OF THE INVENTION

It is, therefore, an object of the present invention to provide an operation microscope in which an assistant's microscope unit is movable between a usage position and a non-usage position, regardless of the number of microscope units.

In order to achieve the above object, an aspect of the present invention relates to an operation microscope including, a microscope body having an illumination optical system which illuminates a subject, a lens barrel, and a main observation optical system which observes the subject, an assistant's microscope unit attached to the microscope body, and a guide rail which is disposed in the lens barrel of the microscope body, and extends in a circumferential direction about a center of an optical axis of an objective lens of the microscope body, wherein the assistant's microscope unit is disposed in the guide rail to be movable between a usage position and a non-usage position in a circumferential direction of the lens barrel.

BRIEF DESCRIPTION OF THE DRAWINGS

These and other features, aspects, and advantages of the present invention will become better understood with regard to the following description, appended claims, and accompanying drawings.

DETAILED DESCRIPTION OF THE PREFERRED EMBODIMENTS

Hereinafter, an embodiment of the present invention will be described with reference to the drawings.

Figure 1:
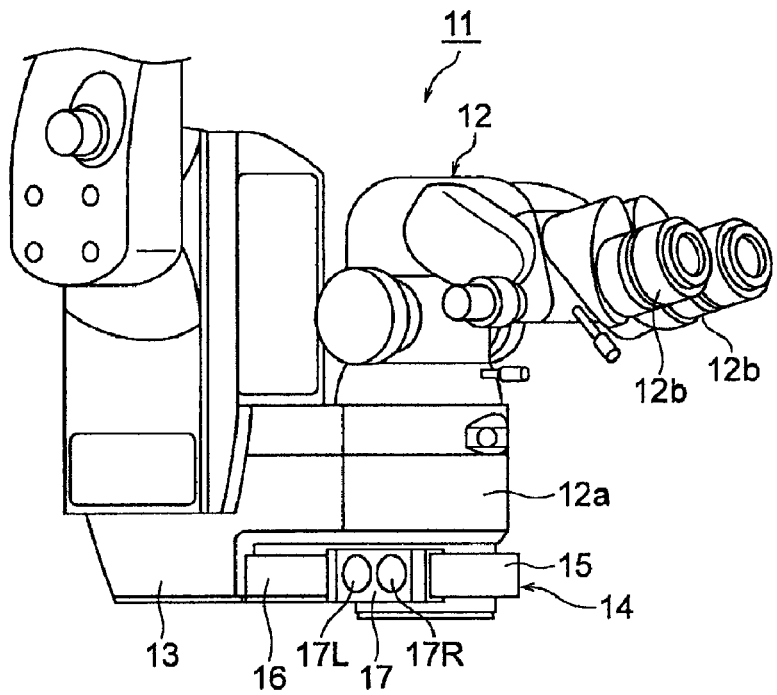
FIG. 1 is a perspective view illustrating an operation microscope according to one embodiment of the present invention.

FIG. 1 illustrates an operation microscope according to the embodiment of the present invention. The operation microscope includes a microscope body 11. The microscope body 11 includes a main microscope unit 12 for an operator and a housing 13 integrally provided in the rear side of the main microscope unit 12.

The main microscope unit 12 includes a lens barrel 12a in which an objective lens 12c is built and right, and left eye lenses 12b, 12b for an operator. The main microscope unit 12 includes a main observation optical system (observation system for an operator) illustrated by M in FIG. 6, 7. The main observation optical system M includes right and left observation optical systems ML, MR (not shown in detail). The detailed explanation of the main optical system M is omitted because a known structure can be adopted for the main observation optical system M.

Figure 2:
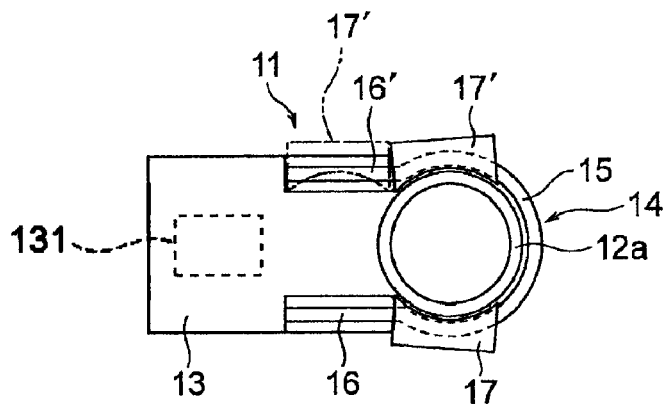
FIG. 2 is a schematic diagram illustrating a guide rail of the operation microscope in FIG. 1.

The housing 13 includes inside thereof an illumination optical system 131 (FIG. 2). The illumination luminous flux from the illumination optical system can be projected onto a subject via a luminous flux deflection member 13a such as a prism and an objective lens 12c. The detailed explanation of the illumination optical system is also omitted because a known structure can be adopted for the illumination optical system.

Figure 4:
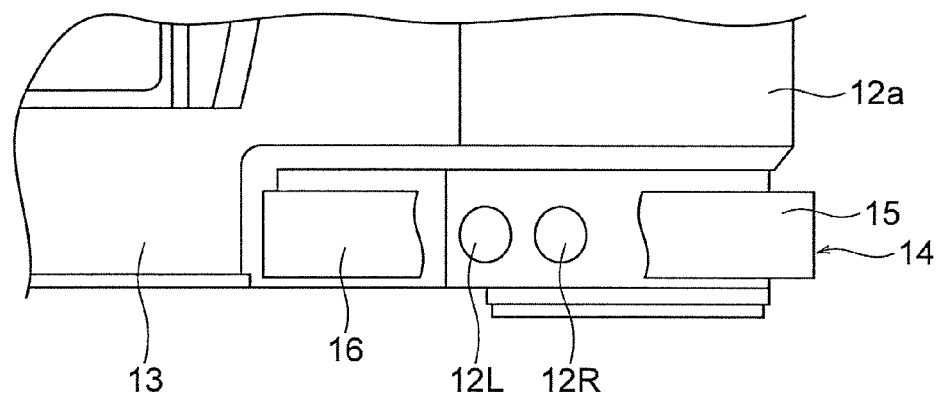
FIG. 4 is a partially enlarged explanatory view illustrating a lens barrel of the operation microscope in FIG. 1.
Figure 6:
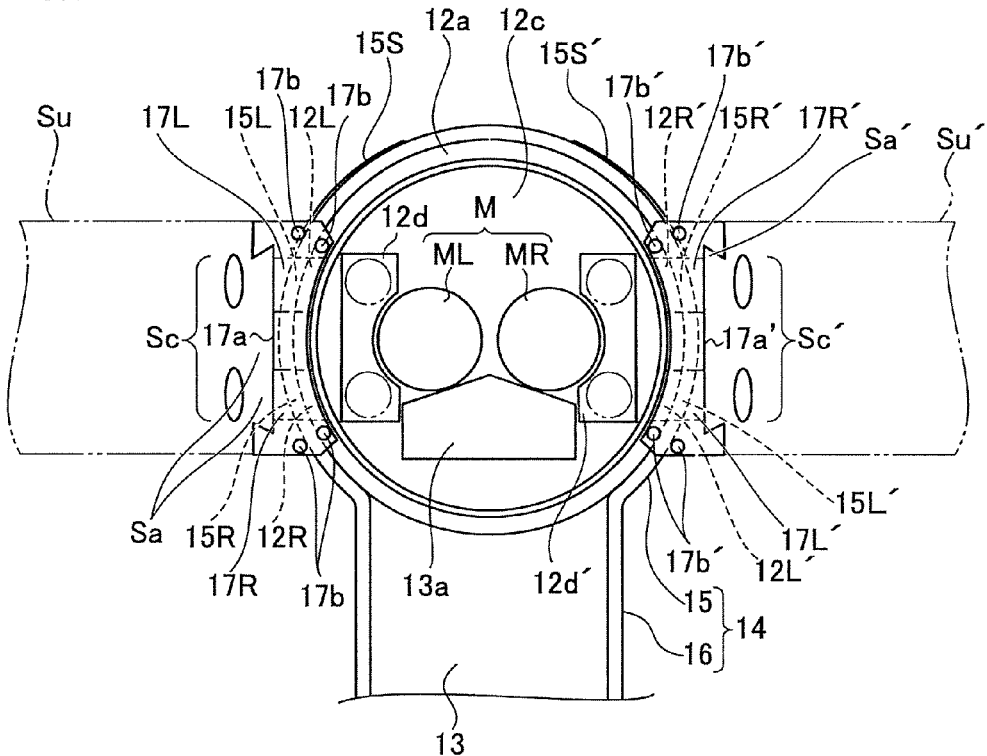
FIG. 6 is a horizontal sectional view illustrating a lower part of the lens barrel in FIG. 1.
Figure 7:
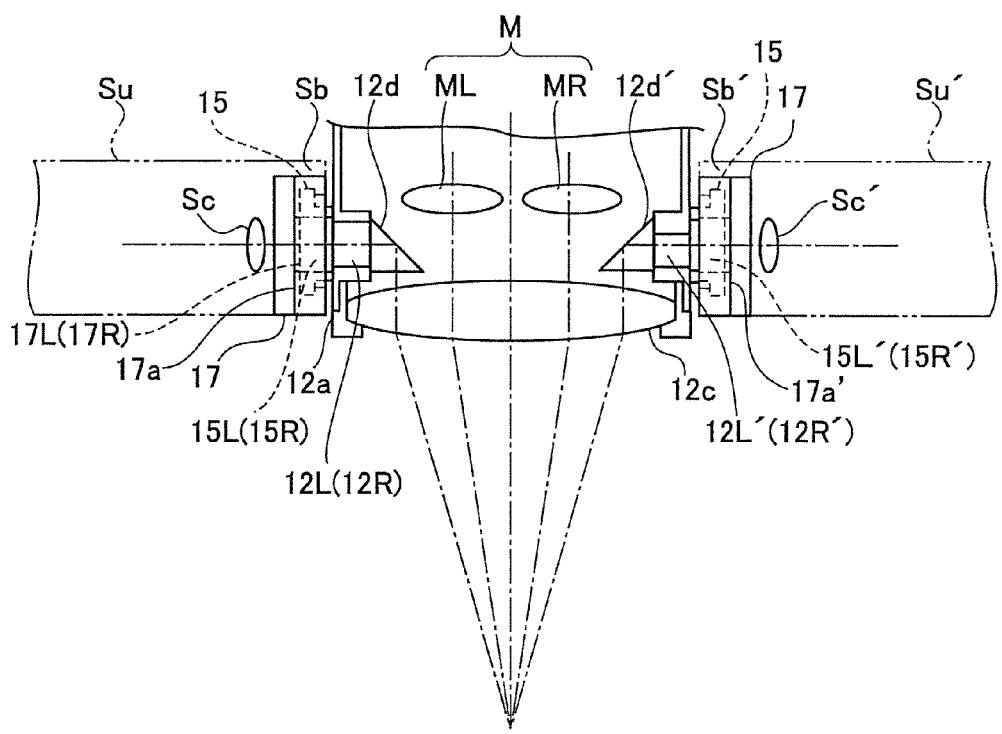
FIG. 7 is a longitudinal sectional view illustrating the lens barrel in FIG. 6.

Provided in the left side part of the lower end part of the main microscope unit 12 is a pair of openings 12L, 12R (refer to FIG. 4) as illustrated in FIG. 6, and also provided in the right side part of the lower end part of the main microscope unit 12 is a pair of openings 12L', 12R'. The lens barrel 12a includes inside thereof luminous flux reflection members 12d, 12d' such as prisms, which reflect toward the openings 12L, 12R and 12L', 12R', respectively, the observation luminous fluxes reflected from the subject (not shown) to enter onto the objective lens 12c.

The lower end part of the main microscope unit 12 is provided with a guide rail which extends to the lens barrel 12a and the housing 13 as illustrated in FIG. 2, 3. The guide rail 14 includes a circular arc guide section 15, which extends in the circumferential direction along the lens barrel 12a, and linear guide sections 16, 16' which extend from the circular arc guide section 15 to the right and left sides of the housing 13, respectively. The circular arc guide section 15 extends in the circumferential direction centering on the optical axis of the objective lens 12c.

Figure 5:
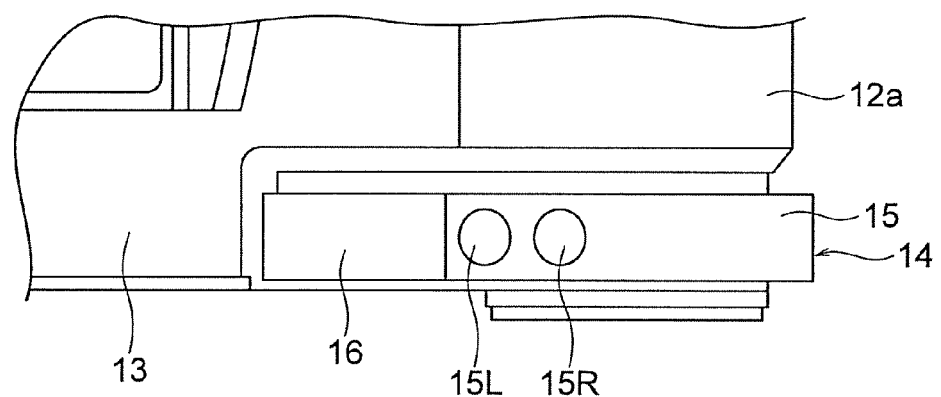
FIG. 5 is a partially enlarged explanatory view illustrating the guide rail of the operation microscope in FIG. 1.

As illustrated in FIG. 6, the one end part of the circular arc guide section 15 is provided with a pair of openings 15L, 15R (refer to FIG. 5) opposed to (communicating with) a pair of openings 12L, 12R. The other end part of the circular arc guide section 15 is provided with a pair of openings 15L', 15R' opposed to (communicating with) a pair of openings 12L', 12R'.

In addition, microscope mounts 17, 17' are mounted on the guide rail 14 so as to be movably disposed along the lens barrel 12a. The microscope mount 17 includes openings 17L, 17R opposed to (communicating with) the openings 15L, 15R, respectively. The microscope mount 17' includes openings 17L', 17R' opposed to (communicating with) the openings 15L', 15R'.

Each of the microscope mounts 17, 17' includes a groove 17a, 17a' to which an assistant's microscope unit Su, Su' (not shown entirely, hereinafter referred to as a microscope unit) is attached.

The assistant's microscope unit Su includes a projection Sa which engages with the groove 17a, and a stopper projection Sb which has contact with the upper end of the microscope mount 17, so as to prevent the falling of the microscope unit Su when the projection Sa engages with the groove 17a. The assistant's microscope unit Su' also includes a projection Sa' which engages with the groove 17a', and a stopper projection Sb' which has contact with the upper end of the microscope mount 17', so as to prevent the falling of the microscope unit Su' when the projection Sa' engages with the groove 17'. Each of the microscope units Su, Su' includes an assistant's optical system Sc, Sc' illustrated in FIG. 6. The details of the optical systems Sc, Sc' are omitted because a known structure can be adopted for the optical systems Sc, Sc'.

The microscope unit Su for an assistant is detachably attached to the microscope mount 17 by fastening the stopper projection Sb to screw holes 17b of the microscope mount 17 by means of fastening screws (not shown). The microscope unit Su' for an assistant is also detachably attached to the microscope mount 17' by fastening the stopper projection Sb' to screw holes 17b' of the microscope mount 17' by means of fastening screws (not shown).

The microscope mount 17 is fastenably provided in the end part of the circular arc guide section 15 at a position (usage position) that the openings 17L, 17R are opposed to (communicating with) the openings 15L, 15R. This fastening can be conducted by means of a fastening pin or a fastening screw (not shown), for example. This structure is the same as the microscope mount 17'.

Figure 3:
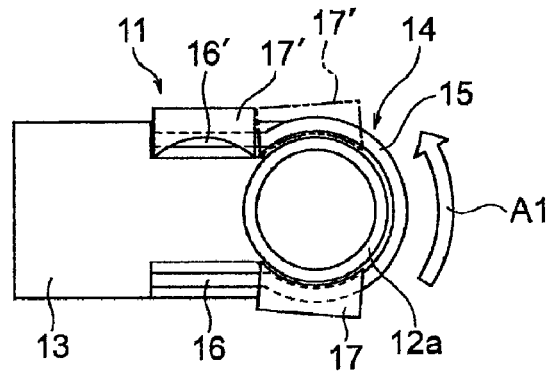
FIG. 3 is a schematic diagram for use illustrating the guide rail of the operation microscope in FIG. 2.

The microscope mount 17' can be moved to a position illustrated by a two-point dotted line from the end part (usage position) of the circular arc guide section 15 illustrated by the solid line in FIG. 2. More particularly, the microscope mount 17' can be disposed in the linear guide section (non-usage position) 16' as illustrated by the solid line from the position illustrated by the two-point dotted line by moving the microscope mount 17' in the direction of the arrow A1 in FIG. 3. Moreover, the microscope mount 17 can be disposed in the linear guide section (non-usage position) 16 by moving the microscope mount 17 in a direction opposite to the direction of the arrow A1 in FIG. 3 from the end part (usage position) of the circular arc guide section 15.

In these positions, the microscope mounts 17, 17' are fastenably provided in the linear guide sections 16, 16' (non-usage position), respectively. These fastenings can be achieved by means of a fastening pin or a fastening screw (not shown), for example.

As illustrated in FIG. 6, the outer circumferential face of the circular arc guide section 15 is provided with plate-like circular arc shutters 15s, 15s' which are movable in the circumferential direction. As the structure for attaching these shutters, for example, an upper supporting groove (not shown) which extends in the circumferential direction and opens downwardly is formed on the upper end part of the outer circumferential face of the circular arc guide section 15, and a lower supporting groove (not shown) which extends in the circumferential direction and opens upwardly is formed on the lower end part of the outer circumferential face of the circular arc guide section 15, so that the upper end part and the lower end part of the shutters 15s, 15s' engage with the upper supporting groove and the lower supporting groove, respectively.

In addition, when the microscope mount 17 is fastened to the linear guide section 16 (non-usage position), the openings 15L, 15R are closed by the shutter 15s. When the microscope mount 17' is fastened to the linear guide section 16' (non-usage position), the openings 15L', 15R' are closed by the shutter 15s'.

The shutters 15s, 15s' can be opened and closed in conjugation with the movement of the microscope mounts 17, 17' by means of a wire or a connection pin (not shown), for example.

Modification Example 1

Figure 8:
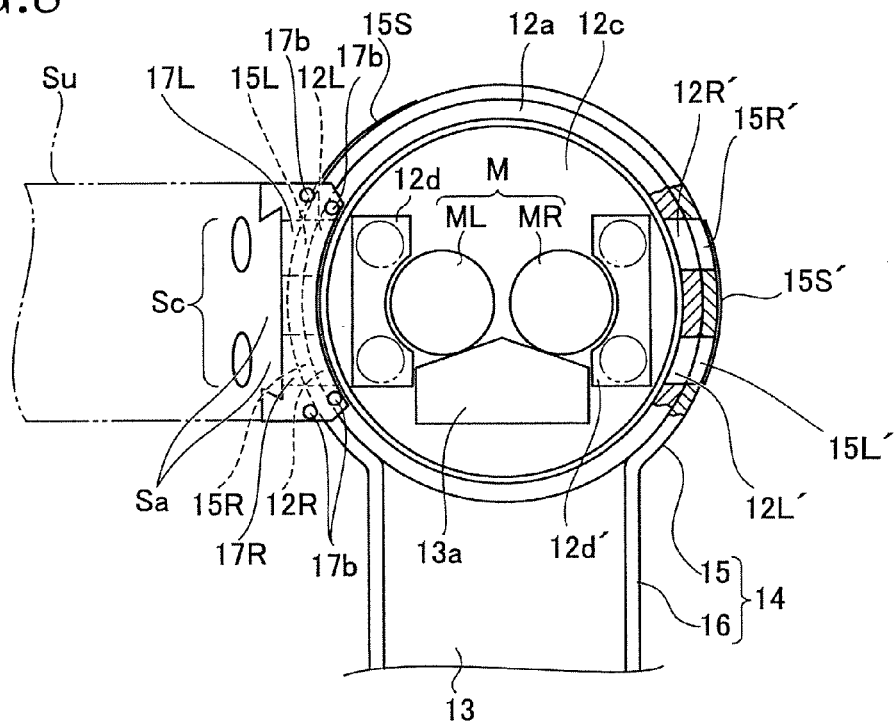
FIG. 8 is a horizontal sectional view of a lens barrel illustrating another modification example of the operation microscope according to the present invention.
Figure 9:
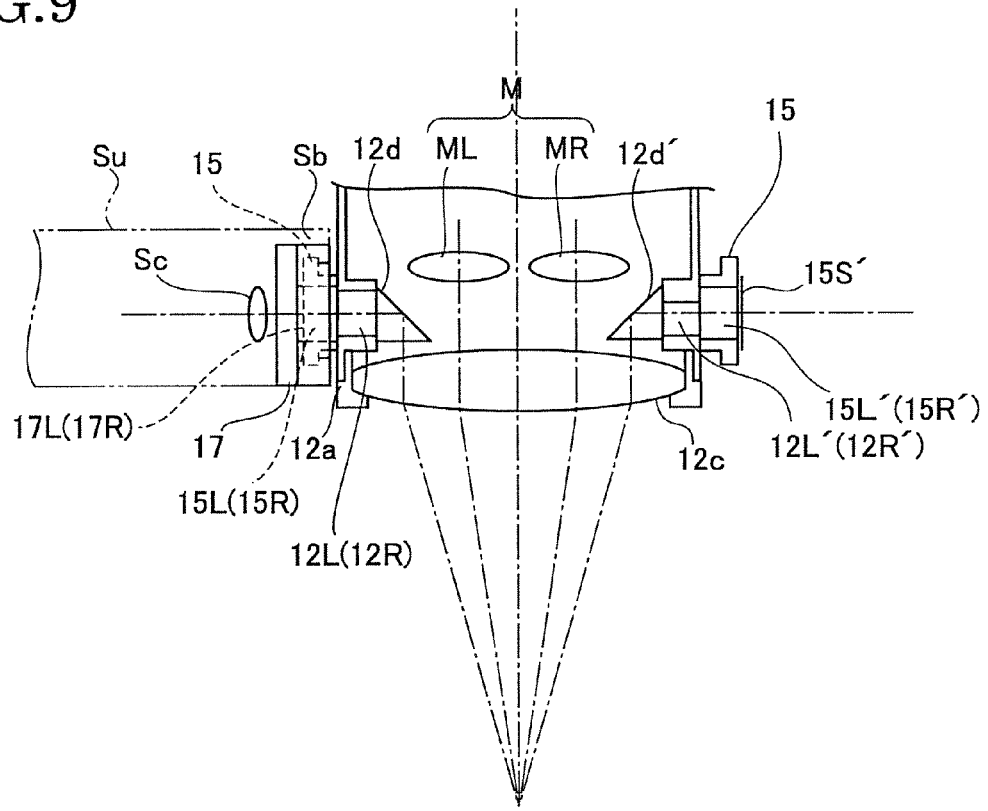
FIG. 9 is a longitudinal sectional view illustrating the lens barrel in FIG. 8.

Moreover, in FIG. 2, 3, an example in which a pair of right and left microscope mounts 17, 17' and a pair of right and left microscope units Su, Su' are disposed is illustrated; however, it is not limited thereto. For example, as illustrated in FIG. 8, 9, only one microscope mount 17 can be disposed, and the microscope mount 17 can be moved in the circumferential direction of the lens barrel 12a along the circular arc guide section 15 of the guide rail 14, so that the microscope mount 17 can be disposed in either the right usage position or the left usage position (the position of the openings 15L, 15R or the position of the openings 15L', 15R').

Modification Example 2

Furthermore, in the above-described embodiment, an example in which the circular arc guide section 15 and the linear guide sections 16, 16 are disposed in the guide rail 14 is illustrated; however, it is not limited thereto.

Figure 10:
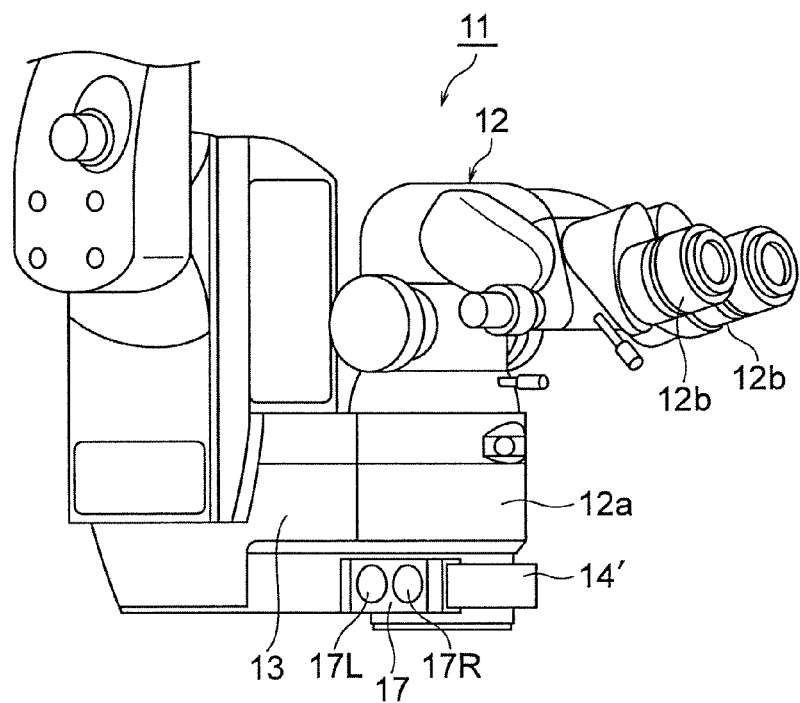
FIG. 10 is a perspective view illustrating another modification example of the operation microscope according to the present invention.
Figure 11:
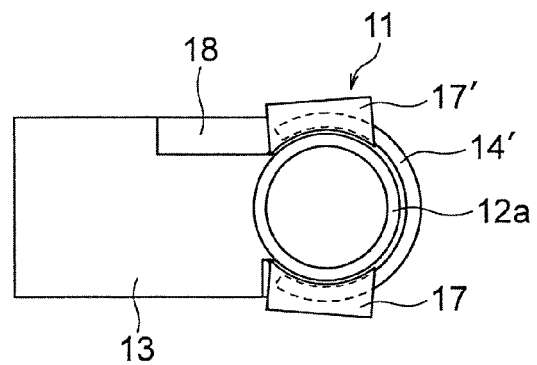
FIG. 11 is a schematic diagram illustrating a guide rail of the operation microscope in FIG. 10.
Figure 12:
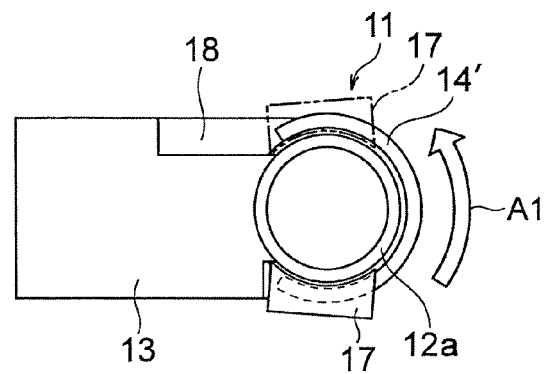
FIG. 12 is a schematic diagram for use illustrating the operation microscope in FIG. 10.
Figure 13:
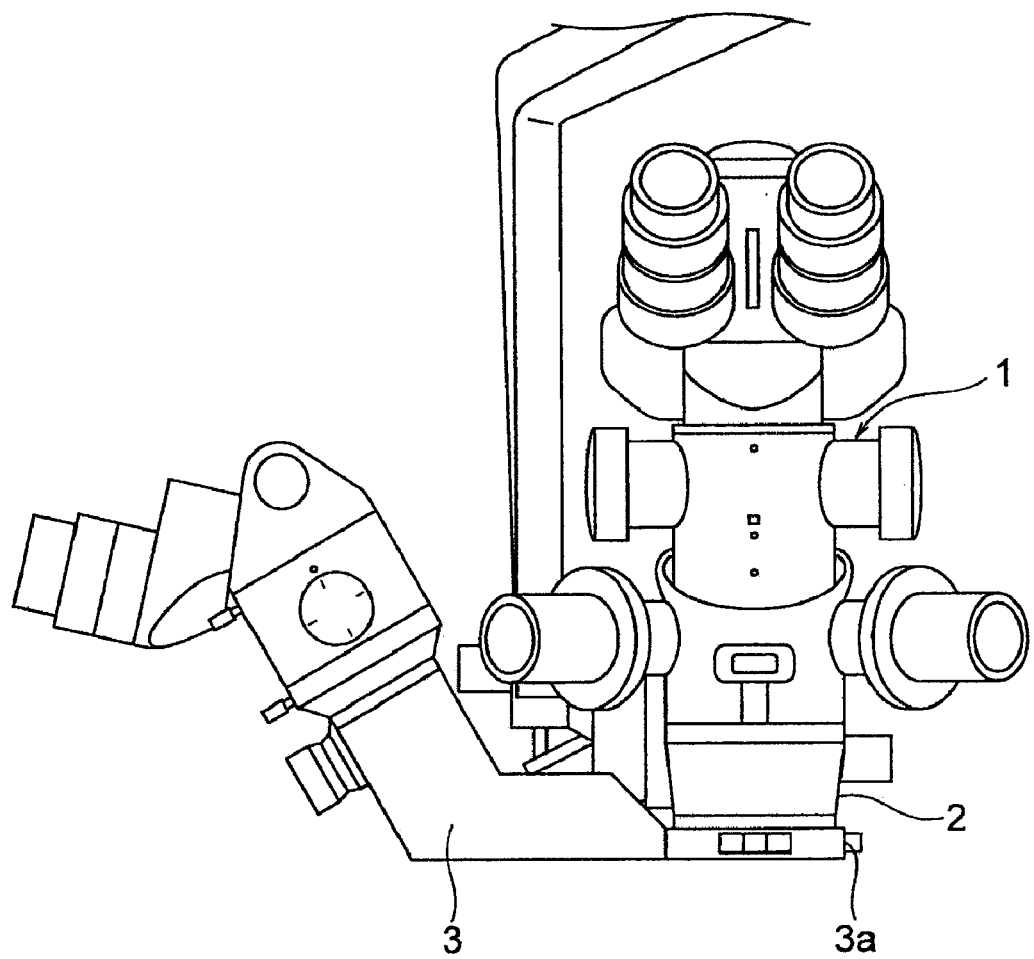
FIG. 13 is a perspective view illustrating one example of a conventional operation microscope.

For example, the linear guide sections 16, 16 of the guide rail 14 illustrated in FIG. 2, 3 can be omitted as illustrated in FIGS. 10-12, and only the circular arc guide section 15 illustrated in FIG. 2, 3 can be used as a guide rail 14' as illustrated in FIGS. 10-12.

In this case, by providing an removing space (non-usage position) 18 in one side of the right and left of the housing 13 illustrated in FIG. 10, the microscope mount 17' can be removed from the end of the guide rail 14' together with an assistant's microscope unit (not shown) when moving the microscope mount 17' from the usage position in FIG. 11 to the removing space (non-usage position) 18 provided in the side of the housing 13.

In FIG. 12, after moving the remaining microscope mount 17 in the direction of the arrow A1, the microscope mount 17 can be removed from the guide rail 14' of the lens barrel 12a by moving the microscope mount 17 to the removing space (non-usage position) 18.

As described above, if the microscope mounts 17, 17' are removed from the guide rail 14', similar to the above-described embodiments, the openings 15L, 15R and the openings 15L7, 15R' are opened by the shutters 15s, 15s'.

As described above the operation microscope according to one embodiment of the present invention includes an illumination optical system which illuminates a subject, the microscope body 11 having the main observation optical system which observes the subject, and the assistant's microscope unit (Su, Su') attached to the microscope body. The operation microscope includes the guide rail 14 which is disposed in the lens barrel 12a of the microscope body 11, and extends in the circumferential direction about the center of the optical axis of the objective lens 12c of the microscope body 11, and the assistant's microscope unit (Su, Su') is disposed in the guide rail 14 to be movable between the usage position and the non-usage position in the circumferential direction of the lens barrel 12.

According to this structure, since the assistant's microscope unit (Su, Su') is attached to the guide rail 14 to be movable from the usage position and the non-usage position, the assistant's microscope unit (Su, Su') can be moved to the non-usage position regardless of the number of microscope units.

Moreover, in the operation microscope according to one embodiment of the present invention, the guide rail 14 includes the guide section (guide rail 14') which moves the assistant's microscope unit (Su, Su') from the usage position to the non-usage position.

According to this structure, by moving the assistant's microscope unit (Su, Su') to the non-usage position (removing space 18), the assistant's microscope unit (Su, Su') can be disposed without inconveniencing the operator.

Furthermore, in the operation microscope according to one embodiment of the present invention, the assistant's microscope unit (Su, Su') is removable from both ends in the non-usage positions (removing space 18) of the guide rail 14'.

According to this structure, since the assistant's microscope unit for an assistant (Su, Su') can be easily removed from the guide rail at the non-usage position, the assistant's microscope unit (Su, Su') can be disposed without inconveniencing the operator.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An operation microscope, comprising:
   a microscope body having an illumination optical system which illuminates a subject, a lens barrel, and a main observation optical system which observes the subject;
   an assistant's microscope unit attached to the microscope body; and
   a guide rail which is disposed in the lens barrel of the microscope body, and extends in a circumferential direction about a center of an optical axis of an objective lens of the microscope body, wherein
   the assistant's microscope unit is disposed in the guide rail to be movable between a usage position and a non-usage position in a circumferential direction of the lens barrel,
   the microscope body includes in a lower end part thereof a pair of first openings, the guide rail includes a pair of second openings which are opposed to the pair of first openings, and the guide rail includes a shutter which closes the pair of first openings provided in the lower end part of the microscope body and the pair of second openings provided in the guide rail when fastening the assistant's microscope unit to the non-usage position,
   wherein the guide rail includes a circular arc guide section which extends along the circumferential direction of the lens barrel, and linear guide sections which are disposed to extend from the circular arc guide section to right and left side portions of the microscope body, respectively, and
   wherein the usage position is located in an outer circumference face of the circular arc guide section, and the non-usage position is located in the linear guide sections.

2. The operation microscope according to claim 1, wherein the assistant's microscope unit is removable from both ends in the non-usage position of the guide rail.

3. The operation microscope according to claim 1, wherein the microscope body includes a stopper which prevents the assistant's microscope unit from falling.

* * * * *